(12) United States Patent
Kawasaki et al.

(10) Patent No.: US 8,538,612 B2
(45) Date of Patent: Sep. 17, 2013

(54) DEVICE FOR CONTROLLING HYBRID CONSTRUCTION MACHINE

(75) Inventors: Haruhiko Kawasaki, Tokyo (JP); Masahiro Egawa, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 519 days.

(21) Appl. No.: 12/937,557

(22) PCT Filed: Apr. 13, 2009

(86) PCT No.: PCT/JP2009/057434
§ 371 (c)(1),
(2), (4) Date: Nov. 22, 2010

(87) PCT Pub. No.: WO2009/128418
PCT Pub. Date: Oct. 22, 2009

(65) Prior Publication Data
US 2011/0060491 A1     Mar. 10, 2011

(30) Foreign Application Priority Data

Apr. 14, 2008   (JP) ................................. 2008-104284

(51) Int. Cl.
*B60L 9/00*        (2006.01)
*B60L 11/00*       (2006.01)
*G05D 1/00*        (2006.01)
*G05D 3/00*        (2006.01)
*G06F 7/00*        (2006.01)
*G06F 17/00*       (2006.01)

(52) U.S. Cl.
USPC .......................................................... 701/22

(58) Field of Classification Search
USPC .......................................................... 701/22
See application file for complete search history.

(56) References Cited

U.S. PATENT DOCUMENTS

| | | | |
|---|---|---|---|
| 2005/0001606 A1* | 1/2005 | Kagoshima | 323/371 |
| 2005/0103006 A1* | 5/2005 | Yoshino | 60/413 |
| 2006/0090461 A1* | 5/2006 | Yoshino | 60/468 |
| 2006/0090462 A1* | 5/2006 | Yoshino | 60/468 |
| 2006/0242958 A1* | 11/2006 | Horii | 60/468 |
| 2008/0071438 A1* | 3/2008 | Nasr et al. | 701/22 |
| 2008/0300757 A1* | 12/2008 | Kanayama et al. | 701/50 |

* cited by examiner

*Primary Examiner* — Khoi Tran
*Assistant Examiner* — Harry Oh
(74) *Attorney, Agent, or Firm* — Cozen O'Connor

(57) ABSTRACT

When an actuator in an operational mechanical system having a short continuous operation time is operated using a small-capacity electric motor (MG), an electric motor is rotated in the range exceeding a rated capacity, and during traveling with a long continuous operation time, the electric motor is rotated at the rated capacity or less. A controller (C) determines, from signals from mode sensors (5a, 12a), whether the construction machine is in traveling mode or in traveling halt operation mode. When determining that the construction machine is in the traveling halt operation mode, the controller (C) sets the construction machine to a high output setting in which the electric motor (MG) rotates in the rage exceeding the rated capacity. In the normal traveling mode, the controller (C) sets the construction machine to a low output setting so that the electric motor rotates at the rated capacity or less.

10 Claims, 2 Drawing Sheets

DEVICE FOR CONTROLLING HYBRID CONSTRUCTION MACHINE

BACKGROUND OF THE INVENTION

1. Field of the Invention

This invention relates to a device for controlling a hybrid construction machine such as, for example, a power shovel.

2. Description of the Related Art

Typically known construction machines employ a relatively small capacity electric motor and operate the electric motor at a rated capacity or higher when an actuator is also operated. The followings are reasons for consciously employing a small-capacity electric motor and operating it at a rated capacity or higher in this manner. Using a smaller capacity electric motor provides correspondingly larger cost advantage. Further, even when the electric motor runs at a rated capacity or higher, disadvantageous problems such as burning hardly arise because an actuator of the construction machine, for example, a bucket cylinder, an arm cylinder, a boom cylinder, a rotation motor or the like is continuously operated for a very short time, some seconds.

[Patent Literature 1] JP-A 2002-275945

SUMMARY OF THE INVENTION

No particular problem arises in a construction machine having a relatively small capacity electric motor used to actuate an actuator in the work mechanical system as described above. However, if the electric motor is used for actuating a travel motor, the following disadvantages arise. For example, an increase in distance over which a construction machine is moved necessarily involves longer continuous operation of the travel motor. If the electric motor is operated at a rated capacity or higher for a long time in such conditions, the electric motor will be burnt. Even if burning can be avoided, such continuous operation for a long time involves an increase in consumed power, resulting in low battery charge at a destination, in turn incapability of actuating the actuator.

It is an object of the present invention to provide a device for controlling a hybrid construction machine which is capable of changing the output of an electric motor between when the machine is in the traveling mode and when it is in the traveling halt operation mode in order to prevent the electric motor from being burnt during traveling, a battery from becoming weak, and the like.

The present invention is based on the premise that a device for controlling a hybrid construction machine includes first, second main pumps of a variable displacement type, first, second circuit systems respectively connected to the first, second main pumps and including a plurality of operated valves for controlling actuators, a first travel-motor operated valve provided in the first circuit system and controlling one of travel motors, and a second travel-motor operated valve provided in the second circuit system and controlling the other travel motor.

Based on the device, a first invention comprises mode sensors respectively provided in the first, second travel-motor operated valves and detecting traveling mode or traveling halt operation mode in accordance with a switching operation of the first, second travel-motor operated valves; a sub pump of a variable displacement type; a tilt angle control unit controlling a tilt angle of the sub pump; an electric motor that is a driving source of the sub pump; first, second merging passages connected to the sub pump and communicating with discharge sides of the first, second main pumps; assist control input means for inputting a signal indicating whether or not assist control is required during travel; and a controller controlling a tilt angle of the sub pump and a rotational speed of the electric motor.

In turn, the controller comprises a function of determining from signals received from the mode sensors provided in the first, second travel-motor operated valves whether the traveling mode or the traveling halt operation mode is selected, and a function of, when receiving a signal representing a need of an assist from the assist control input means during the traveling mode, controlling one of or both a rotational speed of the electric motor and a tilt angle of the sub pump on the basis of a low output setting value relatively lower than that in the traveling halt operation mode.

A second invention provides the controller comprising a function of, when determining from the signal received from the mode sensor that traveling halt operation mode is selected, controlling one of or both a rotational speed of the electric motor and a tilt angle of the sub pump on the basis of a high output setting value relatively higher than that in the traveling mode.

A third and a fourth invention provides the controller comprises a function of, when receiving a signal representing that no need of an assist from the assist control input means during the traveling mode, setting one of or both a rotational speed of the electric motor and a tilt angle of the sub pump to zero.

A fifth and a sixth invention comprises a high power setting input means, in which the controller comprises a function of, when receiving a signal from the high power setting input means during the traveling mode, controlling one of or both a rotational speed of the electric motor and a tilt angle of the sub pump on the basis of the high output setting value in response to the received signal.

A seventh, an eighth, a ninth and a tenth invention comprises pilot flow passages respectively provided in the first, second circuit systems and guiding, to regulators, pilot pressures produced when any of the operated valves is switched; and first, second pressure sensors provided in the pilot flow passages and detecting the pilot pressures in the pilot flow passages.

On the other hand, first, second proportional solenoid throttling valves are respectively provided in the first, second merging passages. The controller comprises a function of calculating flow rates required by the first, second circuit systems in accordance with pilot signals received from the first, second pressure sensors, and a function of controlling the first, second proportional solenoid throttling valves to divide a discharge flow of the sub pump proportionally to the first, second circuit systems.

According to the first invention, since the electric motor can be operated at low output in the travel mode, even when the machine travels for a long time, the electric motor will not be burned or the battery will not be low.

According to the second invention, since, in the traveling halt operation mode, the electric motor can be operated near the maximum rated capacity as in the case of the related art, the power can be sufficiently supplied in the traveling halt operation mode.

According to the third and the fourth invention, when a signal representing no need of an assist is received in the traveling mode, the assist force can be set to zero, thus preventing consumption of energy more than necessary.

According to the fifth and the sixth invention, since the high output setting can be made in response to a signal received from the high power setting input means even in the traveling mode, for example, even if the traveling machine sticks in the mire, the machine can readily escape from the mire.

According to the seventh, the eighth, the ninth and the tenth invention, it is possible to appropriately divide the fluid flow proportionally between the first, second circuit systems in accordance with fluid flows required by the first, second circuit systems.

DETAILED DESCRIPTION OF THE INVENTION

FIG. 1 illustrates a device for controlling a power shovel according to an exemplary embodiment of the present invention, which includes a variable displacement type of a first and a second main pump MP1, MP2. The first main pump MP 1 is connected to a first circuit system, while the second main pump MP 2 is connected to a second circuit system.

To the first circuit system are connected, in order of upstream toward downstream, a rotation-motor operated valve 1 for controlling a rotation motor RM, an arm-in-first-gear operated valve 2 for controlling an arm cylinder (not shown), a boom-in-second-gear operated valve 3 for controlling a boom cylinder BC, an auxiliary operated valve 4 for controlling an auxiliary attachment (not shown), and a first travel-motor operated valve 5 for controlling a first travel motor for left traveling (not shown).

The first travel-motor operated valve 5 is provided with a mode sensor 5a for detecting whether an operating lever (not shown) is in a neutral position or a selecting operation position. When the operating lever is in the neutral position, the mode sensor 5a outputs a traveling halt operation mode signal. When the operating lever is in the selecting operation position, the mode sensor 5a outputs a traveling mode signal.

Each of the operated valves 1 to 5 is connected to the first main pump MP1 via a neutral flow passage 6 and a parallel passage 7.

A pilot pressure generating mechanism 8 is disposed on the neutral flow passage 6 downstream from the first travel-motor operated valve 5. The pilot pressure generating mechanism 8 generates a higher pilot pressure with a higher rate of flow passing through the mechanism 8, and a lower pilot pressure with a lower rate of flow.

When all the operated valves 1 to 5 are in or near the neutral position, the neutral flow passage 6 guides all or part of the fluid discharged from the first main pump MP1 to a tank T. At this condition, the rate of flow passing through the pilot-pressure generating mechanism 8 is increased, so that a high pilot pressure is generated as described above.

On the other hand, when switching the operated valves 1 to 5 in a full stroke position, the neutral flow passage 6 is closed to block the flow of fluid. In this case, accordingly, the rate of flow passing through the pilot-pressure generating mechanism 8 is almost zero, which means that a pilot pressure of zero is kept.

However, depending on manipulated variables of the operated valves 1 to 5, a portion of the pump discharge flow is directed to an actuator and another portion is directed from the neutral flow passage 6 to the tank T. As a result, the pilot pressure generating mechanism 8 generates a pilot pressure in accordance with the rate of flow passing through the neutral flow passage 6. In other words, the pilot pressure generating mechanism 8 generates a pilot pressure in accordance with the manipulated variables of the operated valves 1 to 5.

A pilot flow passage 9 is connected to the pilot-pressure generating mechanism 8, and also connected to a regulator 10 for controlling the tilt angle of the first main pump MP1. The regulator 10 controls the discharge rate of the first main pump MP1 in inverse proportion to the pilot pressure. Accordingly, when the operated valves 1 to 5 are fully stroked and then the flow rate in the neutral flow passage 6 changes to zero, in other words, when the pilot pressure generated by the pilot-pressure generating mechanism 8 reaches zero, the discharge rate of the first main pump MP1 is maintained at maximum.

A first pressure sensor 11 is connected to the pilot flow passage 9 configured as described above, and detects a pressure signal which is then applied to a controller C. The pilot pressure in the pilot flow passage 9 varies in accordance with the manipulated variable of the operated valve. As a result, the pressure signal detected by the first pressure sensor 11 is proportional to the flowrate required by the first circuit system.

In turn, to the second circuit system are connected, in order of upstream toward downstream, a second travel-motor operated valve 12 for controlling a second travel motor for right traveling (not shown), a bucket operated valve 13 for controlling a bucket cylinder (not shown), a boom-in-first-gear operated valve 14 for controlling the boom cylinder BC, and an arm-in-second-gear operated valve 15 for controlling the arm cylinder (not shown). Note that the boom-in-first-gear operated valve 14 is provided with a sensor 14a for detecting a manipulated direction and a manipulated variable of the operated valve 14.

The second travel-motor operated valve 12 is provided with a mode sensor 12a for detecting whether an operating lever (not shown) is in a neutral position or a selecting operation position. When the operating lever is in the neutral position, the mode sensor 12a outputs a traveling halt operation mode signal. When the operating lever is in the selecting operation position, the mode sensor 12a outputs a traveling mode signal.

Each of the operated valves 12 to 15 is connected to the second main pump MP2 through the neutral flow passage 16. The bucket operated valve 13 and the boom-in-first-gear operated valve 14 are connected to the second main pump MP2 through a parallel passage 17.

A pilot-pressure generating mechanism 18 is provided on the neutral flow passage 16 downstream from the arm-in-second-gear operated valve 15. The pilot-pressure generating mechanism 18 is exactly identical in function with the pilot-pressure generating mechanism 8 described earlier.

A pilot flow passage 19 is connected to the pilot-pressure generating mechanism 18, and also connected to a regulator 20 for controlling the tilt angle of the second main pump MP2. The regulator 20 controls the discharge rate of the second main pump MP2 in inverse proportion to the pilot pressure. Accordingly, when the operated valves 12 to 15 are fully stroked and the flow rate in the neutral flow passage 16 changes to zero, in other words, when the pilot pressure generated by the pilot-pressure generating mechanism 18 reaches zero, a maximum discharge rate of the second main pump MP2 is maintained.

A second pressure sensor 21 is connected to the pilot flow passage 19 configured as described above, and detects a pressure signal which is then applied to the controller C. The pilot pressure in the pilot flow passage 19 varies in accordance with the manipulated variable of the operated valve. As a result, the pressure signal detected by the second pressure sensor 21 is proportional to the flowrate required by the second circuit system.

The first, second main pumps MP1, MP2 arranged as described above rotate coaxially by a drive force of one engine E. The engine E is equipped with a generator 22, such that the generator 22 is rotated by an excess output of the engine E for electric generation. The electric power generated by the generator 22 passes through a battery charger 23 to recharge the battery 24.

The battery charger 23 is adapted to recharge the battery 24 even when it is connected to a usual household power source 25. That is, the battery charger 23 is connectable to an independent power source other than the controller.

An actuator port of the rotation-motor operated valve 1 connected to the first circuit system is connected to passages 26, 27 which communicate with the rotation motor RM. Brake valves 28, 29 are respectively connected to the passages 26, 27. When the rotation motor operated valve 1 is kept in its neutral position (not shown), the actuator port is closed, so that the rotation motor RM maintains its stop state.

The rotation-motor operated valve 1 is switched from this position to, for example, a right position in FIG. 1, whereupon one passage 26 of the passages 26, 27 is connected to the first main pump MP1, while the other passage 27 is connected to the tank T. As a result, a pressure fluid is supplied through the passage 26 to rotate the rotation motor RM, while the return fluid flows from the rotation motor RM through the passage 27 back to the tank T.

On the other hand, when the rotation-motor operated valve 1 is switched to a left position, the pump discharge fluid flows into the passage 27, while the passage 26 is connected to the tank T, so that the rotation motor RM rotates in the opposite direction.

In this manner, during the operation of the rotation motor RM, the brake valve 28 or 29 functions as a relief valve. Then, when the pressure in the passage 26, 27 exceeds a set pressure, the brake valve 28, 29 is opened to introduce the fluid from the high pressure side to the low pressure side. When the rotation-motor operated valve 1 is moved back to the neutral position while the rotation motor RM is rotating, the actuator port of the operated valve 1 is closed. Even when the actuator port of the operated valve 1 is closed in this manner, the rotation motor RM continues to rotate by its inertial energy. By rotating by its inertial energy, the rotation motor RM acts as a pump. At this stage, the passages 26, 27, the rotation motor RM and the brake valve 28 or 29 form a closed circuit. The brake valve 28 or 29 converts the inertial energy to thermal energy.

On the other hand, when the boom-in-first-gear operated valve 14 is switched from the neutral position to a right position in FIG. 1, the pressure fluid flowing from the second main pump MP2 is supplied through a passage 30 to a piston chamber 31 of the boom cylinder BC, and the return fluid flows from a rod chamber 32 of the boom cylinder BC through a passage 33 to the tank T, resulting in extension of the boom cylinder BC.

In contrary, upon switching of the boom-in-first-gear operated valve 14 in the left direction in FIG. 1, a pressure fluid flowing from the second main pump MP2 is supplied through the passage 33 to the rod chamber 32 of the boom cylinder BC, while the return fluid flows from the piston chamber 31 through the passage 30 back to the tank T, resulting in contraction of the boom cylinder BC. Note that the boom-in-second-gear operated valve 3 is switched in conjunction with the boom-in-first-gear operated valve 14.

A proportional solenoid valve 34, the degree of opening of which is controlled by the controller C, is provided on the passage 30 connected between the piston chamber 31 of the boom cylinder BC and the boom-in-first-gear operated valve 14 as described above. Note that the proportional solenoid valve 34 is kept in the full open position when it is in its normal state.

Next, a variable displacement sub-pump SP for assisting in the output of the first, second main pump MP1, MP2 will be described.

The variable displacement sub-pump SP rotates by a drive force of an electric motor MG also serving as a generator, and a variable displacement assist motor AM also rotates coaxially by the drive force of the electric motor MG. The electric motor MG is connected to an inverter I. The inverter I is connected to the controller C. Thus, the controller C can control a rotational speed and the like of the electric motor MG.

Tilt angles of the sub pump SP and the assist motor AM are controlled by tilt-angle control units 35, 36 which are controlled through output signals of the controller C.

The sub-pump SP is connected to a discharge passage 37. The discharge passage 37 is divided into two passages, a first merging passage 38 that merges with the discharge side of the first main pump MP1 and a second merging passage 39 that merges with the discharge side of the second main pump MP2. The first, second merging passages 38, 39 are respectively provided with first, second proportional solenoid throttling valves 40, 41 the degrees of openings of which are controlled by signals output from the controller C.

On the other hand, the assist motor AM is connected to a connection passage 42. The connection passage 42 is connected through the merging passage 43 and check valves 44, 45 to the passages 26, 27 which are connected to the rotation motor RM. In addition, a solenoid directional control valve 46, the opening/closing of which is controlled by the controller C, is provided on the merging passage 43. A pressure sensor 47 is disposed between the solenoid directional control valve 46 and the check valves 44, 45 for detecting a pressure of the rotation motor RM in the turning operation or a pressure of it in the braking operation. A pressure signal of the pressure sensor 47 is applied to the controller C.

A pressure relief valve 48 is provided on the merging passage 43 downstream from the solenoid directional control valve 46 for the flow from the rotation motor RM to the connection passage 42. The pressure relief valve 48 maintains the pressure in the passages 26, 27 to prevent so called runaway of the rotation motor RM in the event of a failure occurring in the system of the connection passages 42, 43, for example, in the solenoid directional control valve 46 or the like.

Another passage 49 is provided between the boom cylinder BC and the proportional solenoid valve 34 and communicates with the connection passage 42. A solenoid on/off valve 50 controlled by the controller C is disposed on the passage 49.

The controller C is also connected to an assist setting input means AI and a high-power setting input means HI. The operator determines whether to turn on or off the assist set input means AI in the operation of the first, second travel-motor operated valve 5, 12. When determining to require an assist, the operator turns on the assist setting input means AI. Likewise, the operator determines whether to turn on or off the high-power setting input means HI. For example, when the operator determines to require high power for removing the construction machine from the mud, the operator turns on the high-power setting input means HI.

If the operated valves 1 to 5 in the first circuit system are kept in their neutral positions, the total amount of fluid discharged from the first main pump MP1 is introduced through the neutral passage 6 and the pilot pressure generating mechanism 8 to the tank T. When the total amount of fluid discharged from the first main pump MP1 flows through the pilot pressure generating mechanism 8 in this manner, the pilot pressure generating mechanism 8 generates a high pilot pressure, and a relatively high pilot pressure is introduced into the pilot passage 9. Then, the high pilot pressure introduced into the pilot passage 9 acts to operate the regulator 10, so that the regulator 10 maintains the discharge rate of the first main pump MP1 at a minimum. A pressure signal indicative of the high pilot pressure at this stage is applied to the controller C from the first pressure sensor 11.

Similarly, when the operated valves 12 to 15 in the second circuit system are kept in their neutral positions, the pilot pressure generating mechanism 18 generates a relatively high pilot pressure as in the case of the first circuit system, and the high pilot pressure acts on the regulator 20, so that the regulator 20 maintains the discharge rate of the second main pump MP2 at a minimum. A pressure signal indicative of the high pilot pressure at this stage is applied to the controller C from the pressure sensor 21.

Upon reception of the signal indicative of the relatively high pressure from the first, second pressure sensor 11, 21, the controller C determines that the first, second main pump MP1, MP2 maintains a minimum discharge rate and controls the tilt control unit 35, 36 to reduce the tilt angles of the sub pump SP and the assist motor AM to zero or to a minimum.

Note that the controller C may either stop or continue the rotation of the electric motor MG when the controller C receives a signal indicative of a minimum discharge rate of the first, second main pump MP1, MP2 as described above.

When the rotation of the electric motor MG is stopped, there is an advantageous effect of reduced power consumption. When the rotation of the electric motor MG is continued, the sub pump SP and the assist motor AM continue to rotate. As a result, there is an advantageous effect of lessened impact occurring when the sub pump SP and the assist motor AM are started. In either case, whether the electric motor MG should be stopped or continued to rotate may be determined with reference to a use or use environment of the construction machine.

By switching any operated valve in the first circuit system or the second circuit system under the conditions as described above, the rate of flow passing the neutral passage 6 or 16 is reduced in accordance with the manipulated variable, which involves a reduction in the pilot pressure generated by the pilot pressure generating mechanism 8 or 18. As the pilot pressure reduces, the first main pump MP 1 or the second main pump MP2 increases its tilt angle to increase its discharge rate.

Accordingly, the flow rate required by the first, second circuit system is determined in accordance with the pilot pressure in the pilot flow passage 9, 19. For example, the higher the pilot pressure, the lower the flow rate required by the circuit system, whereas the lower the pilot pressure, the higher the flow rate required by the circuit system.

Next, the function of the controller C will be described with reference to the flowchart in FIG. 2.

The controller C reads signals transmitted from the first, second pressure sensors 11, 21 as described above (step S1), and calculates a proportional distribution of the flow rates required by the first, second circuit systems in accordance with the pilot pressure signals (step S2).

Then, the controller C determines whether or not the construction machine is in the traveling mode, from signals received from the mode sensors 5a, 12a which are indicative of whether or not the first, second travel-motor operated valves 5, 12 are switched (step S3). A determination whether or not the traveling mode is selected is made by determining whether or not the first, second travel-motor operated valves 5, 12 are operated. The mode sensor 5a, 12a detects the mode on the basis of a manipulated position of the operation lever of the first, second travel-motor operated valve 5, 12.

On the other hand, when the construction machine is not in the traveling mode, in other words, is in the normal traveling halt operation mode, the controller C controls a high output setting to be relatively higher than that in the traveling mode. That is, the controller C sets a power control value and a torque control value for the electric motor MG such that the electric motor MG is rotated within the range of high output settings and also at higher than the rated capacity (steps S4, S5). Each of the power control and torque control values at this time is a preset value. The controller C also determines flow split values for splitting the flow into two, the first and second circuit systems, on the basis of the proportional distribution calculated at step S2 (step S6).

Then, the controller C maintains the power control value and the torque control value within the range of the high output settings, and simultaneously calculates the most efficient rotational speed of the electric motor MG and the most efficient tilt angle of the sub pump SP, and then controls the rotational speed of the electric motor MG and the tilt angle of the sub pump SP to the calculated rotational speed and the calculated tilt angle (step S7). At this stage, the controller C controls the degrees of opening of the first, second proportional solenoid throttling valves 40, 41 such that the discharge flow of the sub pump SP can be divided proportionally between and delivered to the first, second circuit systems.

When the traveling halt operation mode is selected as described above, the electric motor MG is rotated beyond the rated capacity on the basis of the power control value and the torque control value in the high output setting. However, if the load on the sub pump SP becomes greater, the controller C, for example, reduces the tilt angle of the sub pump SP for control of maintaining the power control value and the torque control value within the range of the high output settings. On the other hand, if the load on the sub pump SP becomes smaller, the controller C, for example, increases the tilt angle of the sub pump SP, increases the rotational speed of the electric motor MG, or alternatively controls simultaneously both the tilt angel and the rotational speed, for control of maintaining the power control value and the torque control value within the range of the high output settings.

On the other hand, when both or one of the first, second travel-motor operated valves 5, 12 are operated, the mode sensors 5a, 12a detect the operations and notify the controller that the traveling mode has been selected. In this case, the process moves from step S3 to step S8, and the controller C determines whether or not the operator has turned on the assist setting input means AI in order to determine whether or not assist control is required.

If the operator does not turn on the assist setting input means AI, the controller C determines that the assist is not required, and goes to step S9 to set "assist zero". In the assist zero setting, the controller C, for example, reduces the tilt angle of the sub pump SP to zero or the rotational speed of the electric motor MG to zero at step S7. In consequence, wasted energy consumption can be circumvented.

When the operator turns on the assist setting input means AI, the controller C goes to step S10 to determine whether or not the operator has turned on the high-power setting input means HI in order to determine whether or not a large amount of power is required.

If the operator determines to need no large amount of power during normal travel and does not turn on the high-power setting input means HI, the controller C goes to step S11 and step S12 to set a traveling power control value and a torque control value adapted to low-output setting which is suitable for continuous travel. Specifically, the traveling power control value and the torque control value are set smaller than those set when the traveling halt operation mode is selected, in order to prevent the electric motor MG from being burned even if the electric motor MG continuously rotates. While maintaining the control values thus set, the controller C goes to step S7 to control the rotational speed of the electric motor MG and the tilt angle of the sub pump SP.

It should be understood that, in this stage, the controller C controls the degrees of opening of the first, second proportional solenoid throttling valves 40, 41 on the basis of the flow split value for the first travel-motor operated valve 5 or the second travel-motor operated valve 12, in response to the pressure signals from the first, second pressure sensors 11, 12.

In step S10, further, if the operator determines to temporarily need a large amount of power, for example, in the event that the construction machine sticks in the mire or the like, and then he turns on the high-power setting input means HI, then the controller C goes to step S13 and step S14 to set a traveling power control value and a torque control value adapted to the high-output setting. Specifically, as in the case of the traveling halt operation mode. The traveling power control value and the torque control value are set such that the electric motor MG rotates beyond the rated capacity within the range of the high-output settings.

From step S14, the controller C executes the processing at step S6 and step S7 as in the above-described case.

According to the embodiment, the electric motor MG can be operated at higher than a rated capacity within the range of high-output settings in the traveling halt operation mode. Accordingly, the use of a relatively small capacity electric motor is made possible, thus correspondingly reducing cost.

In addition, since the low-output setting can be made in the traveling mode, the electric motor is not burned even if it is continuously operated for a long time and the power consumed in the traveling process can be reduced.

However, in the even that the construction machine must escape from, for example, the mire even during travel, the construction machine can be switched to the high output setting at operator's discretion. For this reason, when a high output is required, there will not be a power shortage.

Next, operation of actuators of the work mechanical system other than the traveling system will be described.

For driving the rotation motor RM connected to the first circuit system, the rotation-motor operated valve 1 is switched to either right or left position. For example, switching of the operated valve 1 to the right position in FIG. 1 causes one passage 26 of the passages 26, 27 to communicate with the first main pump MP1 and the other passage 27 to communicate with the tank T in order to rotate the rotation motor RM. The turning pressure at this time is maintained at a set pressure of the brake valve 28. On the other hand, when the operated valve 1 is switched to the left position in FIG. 1, the passage 27 communicates with the first main pump MP1 while the passage 26 communicates with the tank T in order to rotate the rotation motor RM. The turning pressure at this time is maintained at a set pressure of the brake valve 29.

When the rotation-motor operated valve 1 is switched to the neutral position during the turning operation of the rotation motor RM, a closed circuit is constituted between the passages 26, 27 as described earlier, and the brake valve 28 or 29 keeps the brake pressure in the closed circuit for conversion of inertial energy to thermal energy.

The pressure sensor 47 detects a turning pressure or a brake pressure and applies a signal indicative of the detected pressure to the controller C. When the detected pressure is lower than the set pressure of brake valve 28, 29 within a range of it having no influence on the turning operation of the rotation motor RM or the braking operation, the controller C switches the solenoid directional control valve 46 from the closed position to the open position. By thus switching the solenoid directional control valve 46 to the open position, the pressure fluid introduced into the rotation motor RM flows into the merging passage 43 and then through the pressure relief valve 48 and the connection passage 42 into the assist motor AM.

At this stage, the controller C controls the tilt angle of the assist motor AM in response to the pressure signal from the pressure sensor 47 as follows.

Specifically, if the pressure in the passage 26 or 27 is not maintained at a level required for the turning operation or the braking operation, the rotation motor RM cannot be operated for the turning operation or the brake operation.

Therefore, in order to maintain the pressure in the passage 26 or 27 to be equal to the turning pressure or the brake pressure, the controller C controls the load on the rotation motor RM while controlling the tilt angle of the assist motor AM. Specifically, the controller C controls the tilt angle of the assist motor AM such that the pressure detected by the pressure sensor 47 becomes approximately equal to the turning pressure of the rotation motor RM or the brake pressure.

If the assist motor AM obtains a torque as described above, then the torque acts on the electric motor MG which rotates coaxially with the assist motor AM, which means that the torque of the assist motor AM acts as an assist force intended to the electric motor MG. This makes it possible to reduce the power consumption of the electric motor MG by an amount of power corresponding to the torque of the assist motor AM.

The torque of the assist motor AM may be used to assist the torque of the sub pump SP. In this event, the assist motor AM and the sub pump SP are combined with each other to exercise the pressure conversion function.

That is, the pressure of the fluid flowing into the connection passage 42 is inevitably lower than the pump discharge pressure. For the purpose of using the low pressure to maintain a high discharge pressure of the sub pump SP, the assist motor AM and the sub pump SP are adapted to fulfill the booster function.

Specifically, the output of the assist motor AM depends on a product of a displacement volume $Q_1$ per rotation and the pressure $P_1$ at this time. Likewise, the output of the sub pump SP depends on a product of a displacement volume $Q_2$ per rotation and the discharge pressure $P_2$. In the embodiment, since the assist motor AM and the sub pump SP rotate coaxially, equation $Q_1 \times P_1 = Q_2 \times P_2$ must be established. For this purpose, for example, assuming that the displacement volume $Q_1$ of the assist motor AM is three times as high as the displacement volume $Q_2$ of the sub pump SP, that is, $Q_1 = 3Q_2$, the equation $Q_1 \times P_1 = Q_2 \times P_2$ results in $3Q_2 \times P_1 = Q_2 \times P_2$. Dividing both sides of this equation by $Q_2$ gives $3P_1 = P_2$.

Accordingly, if the tilt angle of the sub pump SP is changed to control the displacement volume $Q_2$, a predetermined discharge pressure of the sub pump SP can be maintained using the output of the assist motor AM. In other words, the pressure of the fluid from the rotation motor RM can be built up and then the fluid can be discharged from the sub pump SP.

In this regard, the tilt angle of the assist motor AM is controlled such that the pressure in the passage 26, 27 is maintained to be equal to the turning pressure or the brake pressure. For this reason, in the case of using the fluid flowing from the rotation motor RM, the tilt angle of the assist motor AM is logically determined. After the tilt angle of the assist motor AM has been determined in this manner, the tilt angle of the sub pump SP is controlled in order to fulfill the pressure conversion function.

If the pressure in the system including the connection passage 42 and the merging passage 43 is reduced below the turning pressure or the brake pressure for any reasons, the controller C closes the solenoid directional control valve 46 on the basis of the pressure signal sent from the pressure sensor 47 such that the rotation motor RM is not affected.

When a fluid leak occurs in the connection passage 42, the pressure relief valve 48 operates to prevent the pressure in the passage 26, 27 to reduced more than necessary, thus preventing runaway of the rotation motor RM.

Next, a description will be given of control for the boom cylinder by switching the boom-in-first-gear operated valve 14 and the boom-in-second-gear operated valve 3 in the first circuit system working in conjunction with the operated valve 14.

The boom-in-first-gear operated valve 14 and the operated valve 3 working in conjunction with it are switched in order to actuate the boom cylinder BC, whereupon the sensor 14a detects the manipulated direction and the manipulated variable of the operated valve 14, and sends the manipulation signal to the controller C.

The controller C determines in response to the manipulation signal of the sensor 14a whether the operator is about to move up or down the boom cylinder BC. If the controller C receives a signal indicative of moving-up of the boom cylinder BC, the controller C maintains the proportional solenoid valve 34 in a normal state. In other words, the proportional solenoid valve 34 is kept in its full-open position. At this time, the controller C keeps the solenoid on/off valve 50 in the closed position shown in FIG. 1 and controls the rotational speed of the electric motor MG and the tilt angle of the sub pump SP in order to ensure a predetermined discharge rate of the sub pump SP.

On the other hand, if the controller C receives the signal indicative of moving-down of the boom cylinder BC from the sensor 14a, the controller C calculates a moving-down speed of the boom cylinder BC desired by the operator in accordance with the manipulated variable of the operated valve 14, and closes the proportional solenoid valve 34 and switches the solenoid on/off valve 50 to the open position.

By closing the proportional solenoid valve 34 and switching the solenoid on/off valve 50 to the open position as described above, the total amount of return fluid from the boom cylinder BC is supplied to the assist motor AM. However, if the flow rate consumed by the assist motor AM is lower than the flow rate required for maintaining the moving-down speed desired by the operator, the boom cylinder BC cannot maintains the moving-down speed desired by the operator. In this event, the controller C controls, based on the manipulated variable of the operated valve 14, the tilt angle of the assist motor AM, the rotational speed of the electric motor MG and the like, the degree of opening of the proportional solenoid valve 34 to direct a greater flow rate than that consumed by the assist motor AM back to the tank T, thus maintaining the moving-down speed of the boom cylinder BC desired by the operator.

On the other hand, upon the fluid flowing into the assist motor AM, the assist motor AM rotates and this torque acts on the electric motor MG which rotates coaxially. In turn, the torque of the assist motor AM acts as an assist force intended to the electric motor MG. Thus, the power consumption can be reduced by an amount of power corresponding to the torque of the assist motor AM.

In this regard, the sub pump SP can be rotated using only a torque of the assist motor AM without a power supply to the electric motor MG. In this case, the assist motor AM and the sub pump SP fulfill the pressure conversion function as in the aforementioned case.

Next, the simultaneous actuation of the rotation motor RM for the turning operation and the boom cylinder BC for the moving-down operation will be described.

When the boom cylinder BC is moved down while the rotation motor RM is operated for the turning operation, the fluid from the rotation motor RM and the return fluid from the boom cylinder BC join in the connection passage 42 and flow into the assist motor AM.

In this regard, if the pressure in the connection passage 42 rises, the pressure in the merging passage 43 also rises with this pressure rise. Even if the pressure in the merging passage 43 exceeds the turning pressure or the brake pressure of the rotation motor RM, it has no influence on the rotation motor RM because the check valves 44, 45 are provided.

If the pressure in the connection passage 42 reduces lower than the turning pressure or the brake pressure, the controller C closes the solenoid directional control valve 46 on the basis of a pressure signal from the pressure sensor 47.

Accordingly, when the turning operation of the rotation motor RM and the moving-down operation of the boom cylinder BC are simultaneously performed, the tilt angle of the assist motor AM may be determined with reference to the required moving-down speed of the boom cylinder BC irrespective of the turning pressure or the brake pressure.

At all events, the output of the assist motor AM can be used to assist the output of the sub pump SP, and also the fluid flow discharged from the sub pump SP can be divided at the first, second proportional solenoid throttling valves 40, 41 proportionally between the first, second circuit systems for delivery to the first, second circuit systems.

On the other hand, for use of the assist motor AM as a drive source and the electric motor MG as a generator, the tilt angle of the sub pump SP is changed to zero such that the sub pump SP is put under approximately no-load conditions, and the assist motor AM is maintained to produce an output required for rotating the electric motor MG. By doing so, the output of the assist motor AM can be used to allow the electric motor MG to fulfill the generator function.

In the embodiment, the output of the engine E can be used to allow the generator 22 to generate electric power or the assist motor AM can be used to allow the electric motor MG to generate electric power. Then, the electric power thus generated is accumulated in the battery 24. In this connection, in the embodiment, since the household power source 25 may be used to accumulate electric power in the battery 24, the electric power of the electric motor MG can be utilized for various components.

In the embodiment, on the other hand, the fluid from the rotation motor RM or the boom cylinder BC can be used to rotate the assist motor AM, and also the output of the assist motor AM can be used to assist the sub pump SP and the electric motor MG. This makes it possible to minimize the energy loss produced until regenerated power is available. For example, fluid flowing from an actuator may be used to rotate a generator, and in turn the electric power accumulated by the generator may be used to drive an electric motor, and then the driving force of the electric motor may be used to actuate the actuator. As compared with this case, the regenerated power of the fluid pressure can be used directly.

Note that reference numerals 51, 52 in FIG. 1 denote check valves located downstream of the first, second proportional solenoid throttling valves 40, 41. The check valves 51, 52 permit the fluid to flow from the sub pump SP to the first, second main pumps MP1, MP2 only.

Since the check valves 51, 52 are provided and the solenoid directional control valve 46 and the solenoid on/off valve 50 or the proportional solenoid valve 34 are provided as described above, for example, when a failure occurs in the system including the sub pump SP and the assist motor AM, the system including the first, second main pumps MP1, MP2 can be detached from the system including the sub pump SP and the assist motor AM. In particular, when the solenoid directional control valve 46, the proportional solenoid valve 34 and the solenoid on/off valve 50 are under normal conditions, each of them is kept in its normal position which is the closed position by a spring force of a spring as illustrated in FIG. 1, and also the proportional solenoid valve 34 are kept in their normal positions which are the full open position. For this reason, even if a failure occurs in the electric system, the system including the first, second main pumps MP1, MP2 can be detached from the system including the sub pump SP and the assist motor AM as described above.

For actuating actuators (or an actuator) in the work mechanical system excluding the rotation motor RM or the boom cylinder BC, operated valves connected to the actuators may be operated. When each of such operated valves is operated, it is possible to determine a flow rate required by the first, second circuit system, in accordance with a pilot pressure in the pilot flow passage 9, 19. For this reason, the controller C controls the first, second proportional solenoid throttling valves 40, 41 as described earlier, in order to divide the discharge flow of the sub pump SP proportionally between the first, second circuit systems for delivery for delivery to the first, second circuit systems.

In addition, when the work mechanical system including the rotation motor RM and the boom cylinder BC is operated, the high output setting is selected as described earlier and the electric motor MG rotates in a range of higher than the rated capacity. However, upon the actuation of the rotation motor RM or the boom cylinder BC, the controller C detects this actuation, thus making it possible to perform control of reducing the load on the electric motor MG by an amount corresponding to the assist force of the assist motor AM. Alternatively, instead of a reduction in the load on the electric motor MG, it is possible to increase the power of the electric motor MG by an amount corresponding to the assist power of the assist motor AM, to increase the output of the sub pump SP.

REFERENCE SIGNS LIST

Figure 1:
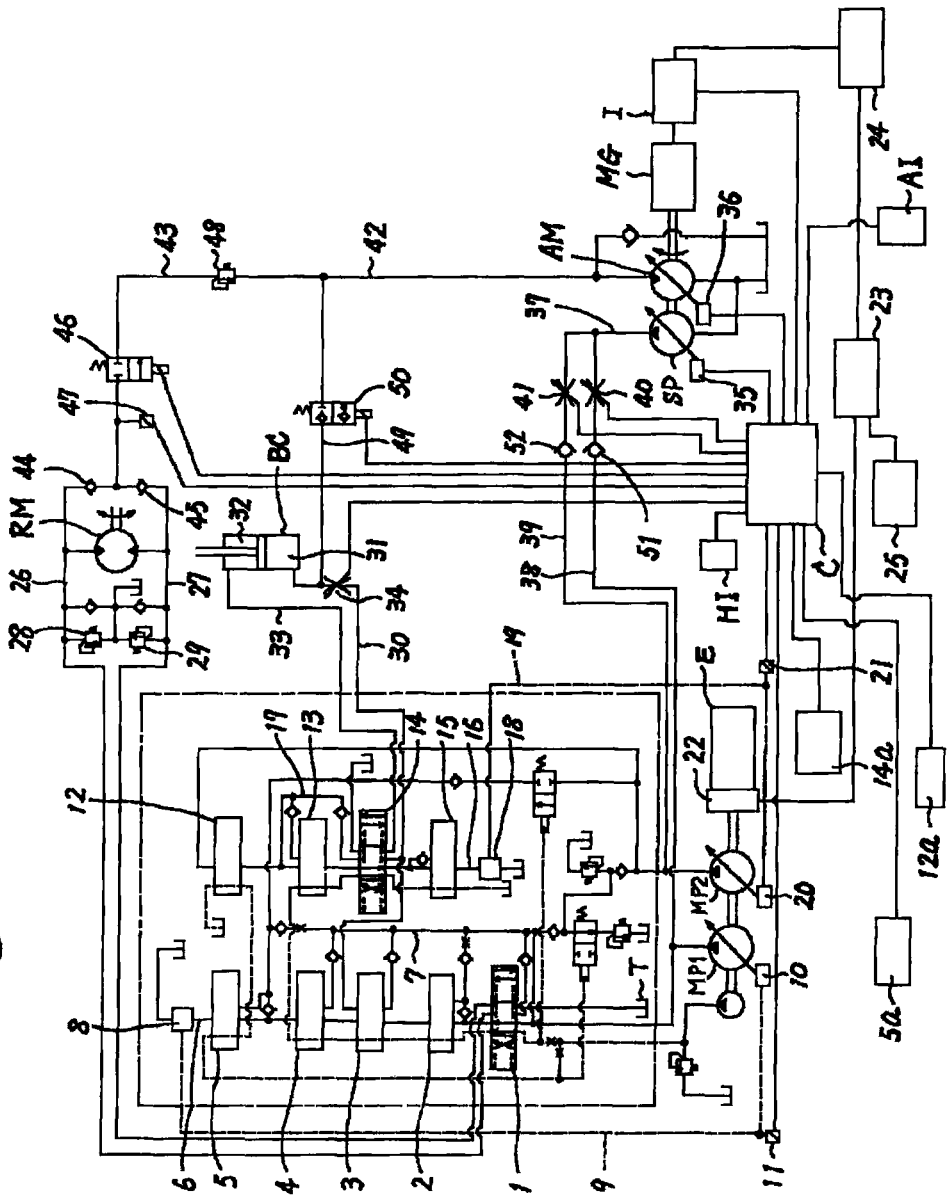
FIG. 1 is a circuit diagram illustrating an embodiment according to the present invention.
Figure 2:
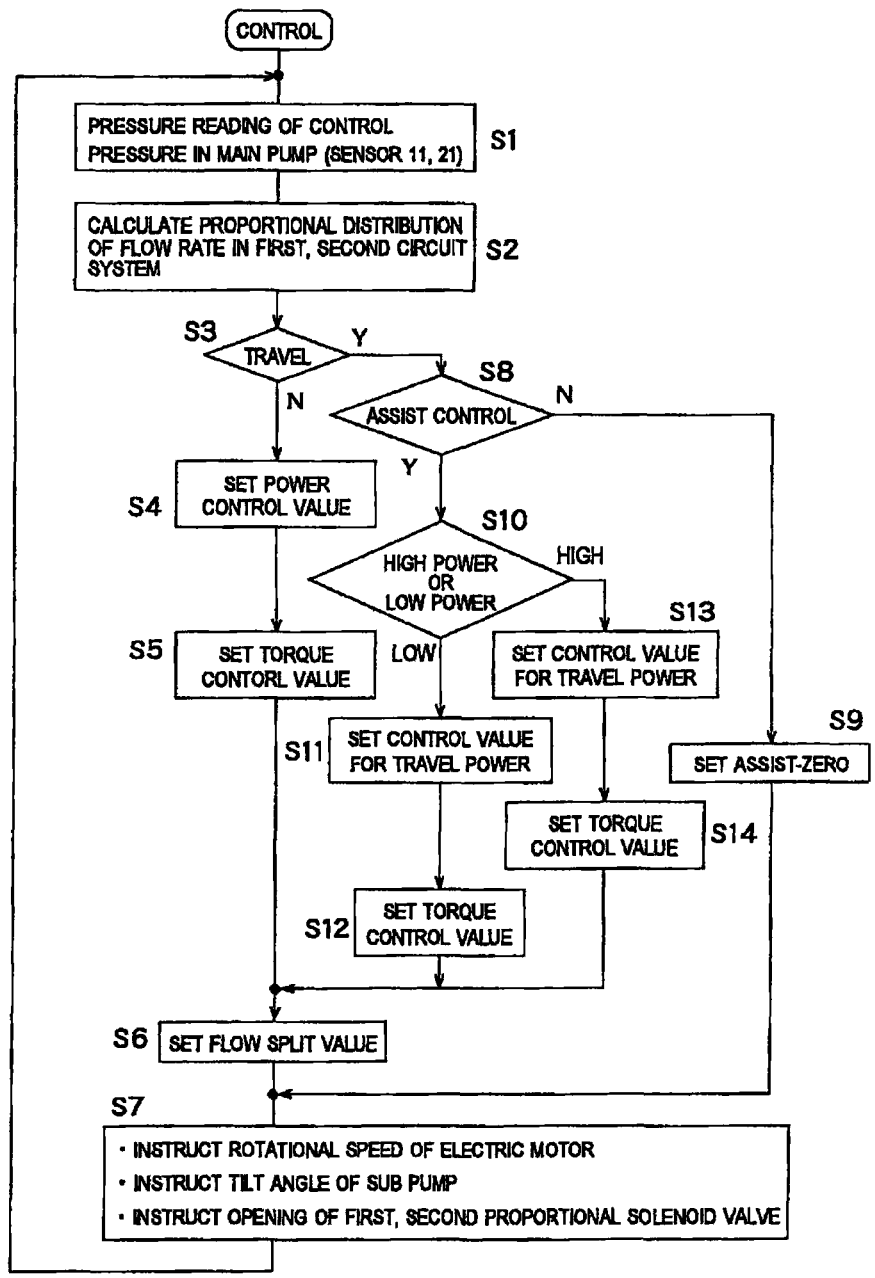
FIG. 2 is a flow chart illustrating a control system of the controller.

MP1 First main pump
MP2 Second main pump
Rotation-motor operated valve
Arm-in-first-gear operated valve
BC Boom cylinder
3 Boom-in-second-gear operated valve
4 Auxiliary operated valve
5 First-travel-motor operated valve
9 Pilot flow passage
10 Regulator
11 First pressure sensor
C Controller
12 Second-travel-motor operated valve
13 Bucket operated valve
14 Boom-in-first-gear operated valve
15 Arm-in-second-gear operated valve
19 Pilot flow passage
20 Regulator
21 Second pressure sensor
SP Sub pump
35, 36 tilt-angle control unit
MG Electric motor also serving as generator
38, 39 First, Second merging passages
40, 41 First, Second proportional solenoid throttling valves
AI Assist setting input means
HI High-power setting input means

What is claimed is:

1. A device for controlling a hybrid construction machine, including
first, second main pumps of a variable displacement type,
first, second circuit systems respectively connected to the first, second main pumps and including a plurality of operated valves for controlling actuators,
a first travel-motor operated valve provided in the first circuit system and controlling one of travel motors, and
a second travel-motor operated valve provided in the second circuit system and controlling the other travel motor,
the device for controlling a hybrid construction machine, comprising:
mode sensors respectively provided in the first, second travel-motor operated valves and detecting traveling mode or traveling halt operation mode in accordance with a switching operation of the first, second travel-motor operated valves;
a sub pump of a variable displacement type;
a tilt angle control unit controlling a tilt angle of the sub pump;
an electric motor that is a driving source of the sub pump;
first, second merging passages connected to the sub pump and communicating with discharge sides of the first, second main pumps;
assist control input means for inputting a signal indicating whether or not assist control is required during travel; and
a controller controlling a tilt angle of the sub pump and a rotational speed of the electric motor,
wherein the controller comprises
a function of determining from signals received from the mode sensors provided in the first, second travel-motor operated valves whether the traveling mode or the traveling halt operation mode is selected, and
a function of, when receiving a signal representing a need of an assist from the assist control input means during the traveling mode, controlling one of or both a rotational speed of the electric motor and a tilt angle of the sub pump on the basis of a low output setting value relatively lower than that in the traveling halt operation mode.

2. The device for controlling a hybrid construction machine according to claim 1, wherein the controller comprises a function of, when determining from the signal received from the mode sensor that traveling halt operation mode is selected, controlling one of or both a rotational speed of the electric motor and a tilt angle of the sub pump on the basis of a high output setting value relatively higher than that in the traveling mode.

3. The device for controlling a hybrid construction machine according to claim 1, wherein the controller comprises a function of, when receiving a signal representing that no need of an assist from the assist control input means during the traveling mode, setting one of or both a rotational speed of the electric motor and a tilt angle of the sub pump to zero.

4. The device for controlling a hybrid construction machine according to claim 2, wherein the controller comprises a function of, when receiving a signal representing that no need of an assist from the assist control input means during the traveling mode, setting one of or both a rotational speed of the electric motor and a tilt angle of the sub pump to zero.

5. The device for controlling a hybrid construction machine according to claim 1, further comprising a high power setting input means, wherein the controller comprises a function of, when receiving a signal from the high power setting input means during the traveling mode, controlling one of or both a rotational speed of the electric motor and a tilt angle of the sub pump on the basis of the high output setting value in response to the received signal.

6. The device for controlling a hybrid construction machine according to claim 2, further comprising a high power setting input means, wherein the controller comprises a function of, when receiving a signal from the high power setting input means during the traveling mode, controlling one of or both a rotational speed of the electric motor and a tilt angle of the sub pump on the basis of the high output setting value in response to the received signal.

7. The device for controlling a hybrid construction machine according to claim 1, further comprising:
   pilot flow passages respectively provided in the first, second circuit systems and guiding, to regulators, pilot pressures produced when any of the operated valves is switched;
   first, second pressure sensors provided in the pilot flow passages and detecting the pilot pressures in the pilot flow passages; and
   first, second proportional solenoid throttling valves respectively provided in the first, second merging passages,
   wherein the controller comprises a function of calculating flow rates required by the first, second circuit systems in accordance with pilot signals received from the first, second pressure sensors, and
   a function of controlling the first, second proportional solenoid throttling valves to divide a discharge flow of the sub pump proportionally between the first, second circuit systems.

8. The device for controlling a hybrid construction machine according to claim 2, further comprising:
   pilot flow passages respectively provided in the first, second circuit systems and guiding, to regulators, pilot pressures produced when any of the operated valves is switched;
   first, second pressure sensors provided in the pilot flow passages and detecting the pilot pressures in the pilot flow passages; and
   first, second proportional solenoid throttling valves respectively provided in the first, second merging passages,
   wherein the controller comprises a function of calculating flow rates required by the first, second circuit systems in accordance with pilot signals received from the first, second pressure sensors, and
   a function of controlling the first, second proportional solenoid throttling valves to divide a discharge flow of the sub pump proportionally between the first, second circuit systems.

9. The device for controlling a hybrid construction machine according to claim 5, further comprising:
   pilot flow passages respectively provided in the first, second circuit systems and guiding, to regulators, pilot pressures produced when any of the operated valves is switched;
   first, second pressure sensors provided in the pilot flow passages and detecting the pilot pressures in the pilot flow passages; and
   first, second proportional solenoid throttling valves respectively provided in the first, second merging passages,
   wherein the controller comprises a function of calculating flow rates required by the first, second circuit systems in accordance with pilot signals received from the first, second pressure sensors, and
   a function of controlling the first, second proportional solenoid throttling valves to divide a discharge flow of the sub pump proportionally between the first, second circuit systems.

10. The device for controlling a hybrid construction machine according to claim 6, further comprising:
    pilot flow passages respectively provided in the first, second circuit systems and guiding, to regulators, pilot pressures produced when any of the operated valves is switched;
    first, second pressure sensors provided in the pilot flow passages and detecting the pilot pressures in the pilot flow passages; and
    first, second proportional solenoid throttling valves respectively provided in the first, second merging passages,
    wherein the controller comprises a function of calculating flow rates required by the first, second circuit systems in accordance with pilot signals received from the first, second pressure sensors, and
    a function of controlling the first, second proportional solenoid throttling valves to divide a discharge flow of the sub pump proportionally between the first, second circuit systems.

* * * * *